Oct. 17, 1939.  J. D. FERRY  2,176,624
IMPELLER MECHANISM FOR COOKERS
Filed Sept. 23, 1937   2 Sheets-Sheet 1
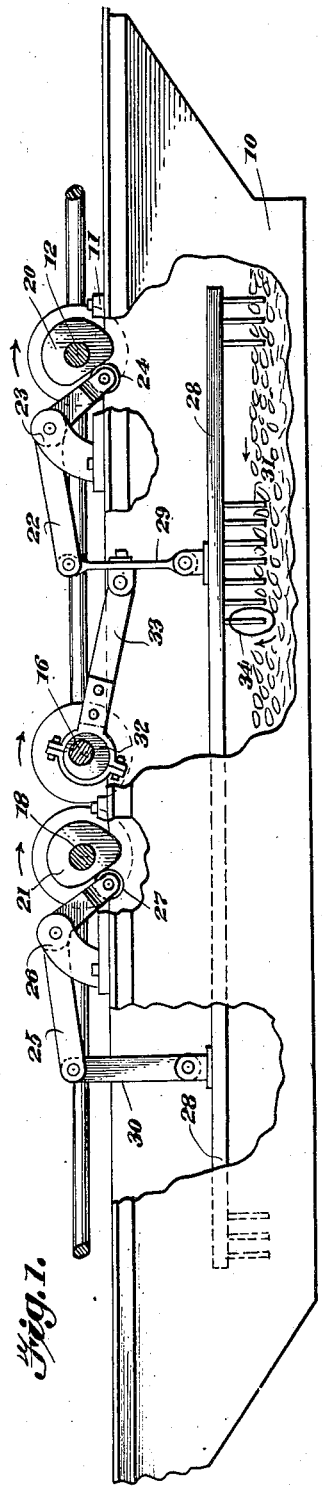
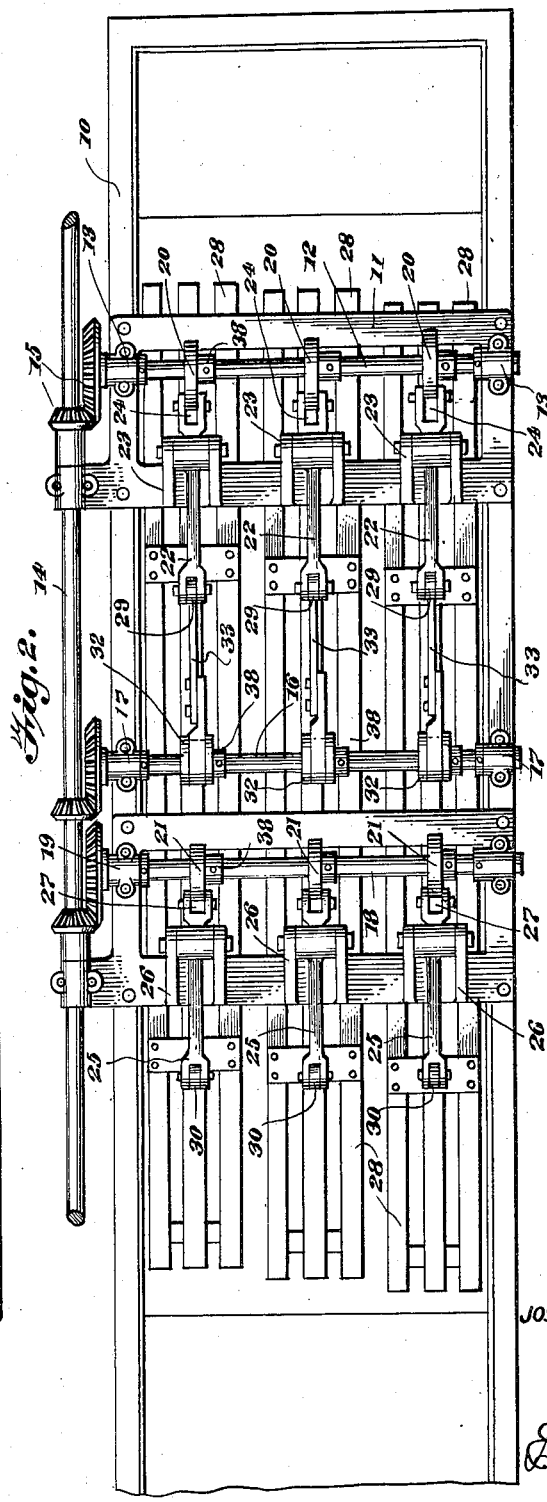
Inventor
JOSEPH D. FERRY Oct. 17, 1939.    J. D. FERRY    2,176,624
IMPELLER MECHANISM FOR COOKERS
Filed Sept. 23, 1937    2 Sheets-Sheet 2
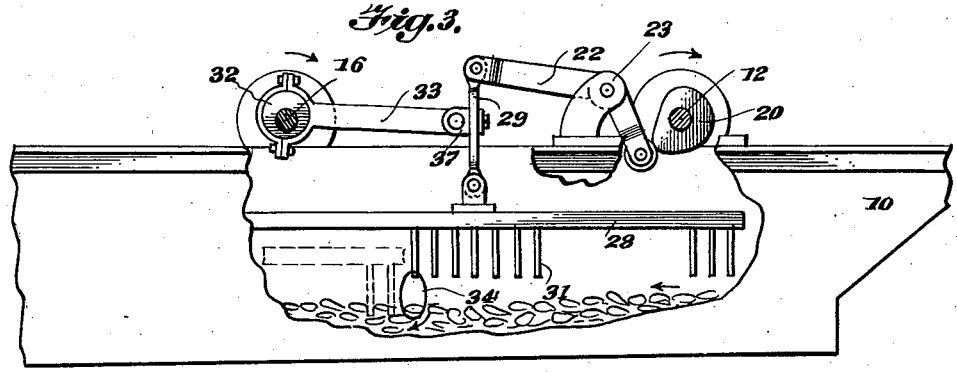
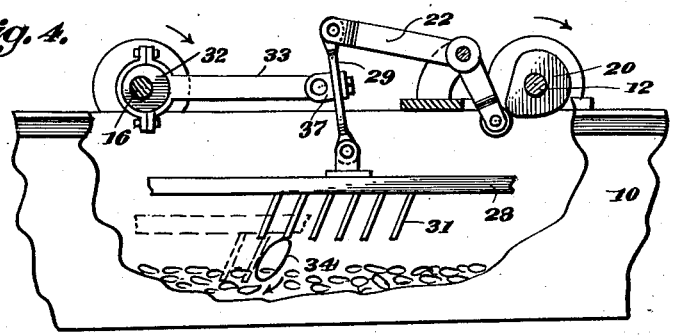
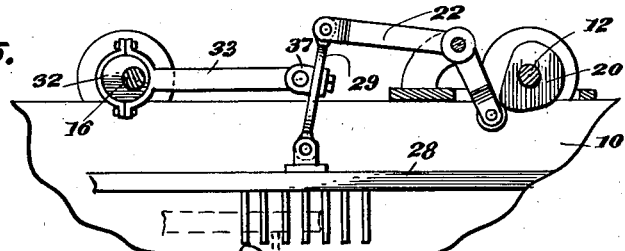
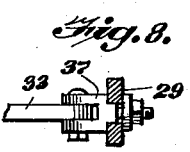
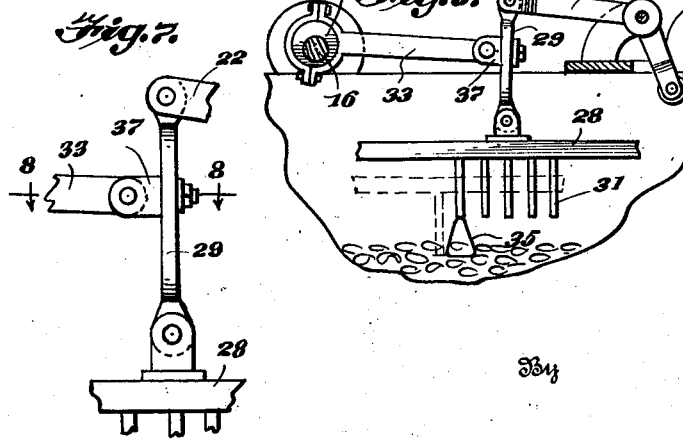
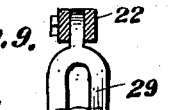
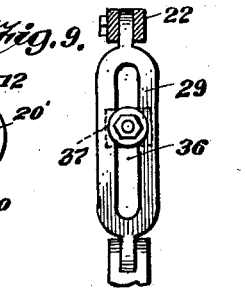
Inventor
JOSEPH D. FERRY
By
E. F. Salter
Attorney Patented Oct. 17, 1939

2,176,624

UNITED STATES PATENT OFFICE 2,176,624

IMPELLER MECHANISM FOR COOKERS

Joseph D. Ferry, Harrisburg, Pa.; Sylvia O. Ferry executrix of said Joseph D. Ferry, deceased Application September 23, 1937, Serial No. 165,391

17 Claims. (Cl. 53—7)

The present invention relates to improvements in food preparing and cooking apparatus such as is used in the preparation of potato chips or the like, although not necessarily restricted to this use, and is directed more particularly to the impelling and immersing mechanism of such apparatus.

In cooking apparatus of this character, it is customary to provide the cooking kettle with impellers which move the articles of food or the like through the kettle and subject them to intermittent advancements and immersions in the cooking liquid as they progress through the cooking kettle.

In my prior Patent No. 2,056,845 is disclosed a mechanism for imparting an elliptical motion to the impellers in which the major axis of the ellipse is disposed in a substantially vertical plane. I now propose to provide mechanism for controlling the elliptical movement of the impellers and to adjust the angular relation of the ellipse to a vertical plane passed transversely through the container.

An important object of the present invention is the provision of a cooking apparatus of this type having impeller operating mechanism which may be quickly and easily controlled and adjusted to produce the desired movement of the impellers.

Another object of the invention is the provision of a new form of tine for use on the impellers.

A further object of the invention is the provision of controlling and adjusting mechanism of this character which is of simple construction and operation and which is inexpensive to produce and to install.

Other objects and advantages of the invention will be apparent during the course of the following description.

In the accompanying drawings, which form a part of this specification and wherein like characters of reference denote like parts throughout:

Figure 1 is a side elevation of the cooking kettle illustrating the position of the impelling mechanism therein, parts being broken away and shown in section.

Figure 2 is a top plan view thereof.

Figure 3 is a fragmentary side elevation of the kettle, parts being broken away to show the impelling mechanism and one adjustment of the impeller control mechanism being illustrated.

Figure 4 is a similar view illustrating a different adjustment of the control mechanism and showing a variation in the disposition of the impeller tines.

Figure 5 is a similar view illustrating still another adjustment of the control mechanism.

Figure 6 is a similar view showing a still further arrangement of the control mechanism.

Figure 7 is a detail view showing an adjustable connection between the impeller link and the corresponding eccentric.

Figure 8 is a detail sectional view on line 8—8 of Figure 7.

Figure 9 is a fragmentary elevation at a right angle to Figure 7.

In the drawings, wherein for the purpose of illustration is shown a preferred embodiment of the invention, the numeral 10 designates a cooking kettle, parts of which are broken away in the drawings, and cooking liquid is normally arranged in this kettle to receive potato chips or the like which enter the kettle at the right hand end and move from right to left in Figure 1 in a general path parallel to the longitudinal axis of the kettle, as shown and described in my prior patent referred to above. The kettle of this invention is of the same type as that shown in my prior patent and is adapted to be used in the apparatus covered by that patent, or in similar apparatus.

An impeller frame 11 is supported immediately above the kettle and may be arranged to be swung away from the kettle in the manner disclosed in my prior patent referred to above, or if desired may be bolted to the kettle as shown herein. A cam shaft 12 is journaled in suitable bearings 13 on the impeller frame adjacent the inlet end of the kettle and the shaft 12 extends transversely of the frame and kettle, being rotated by drive shaft 14 through gearing 15 or by any other suitable means. An eccentric shaft 16 is journaled in bearings 17 carried by the sides of the kettle, and extends parallel to cam shaft 12, being rotated by drive shaft 14. A second cam shaft 18 is journaled in bearings 19 at the left of shaft 16 and is also rotated by drive shaft 14.

Cams 20 are adjustably secured at spaced points on cam shaft 12 while similar cams 21 are similarly secured to cam shaft 18. Bell crank levers 22 are pivotally secured between journal ears 23 on frame 11 adjacent but spaced from cam shaft 12. The short ends of levers 22 carry rollers 24 which engage the cams 20. Similar bell crank levers 25 are journaled in ears 26 adjacent cam shaft 18 and are provided with rollers 27 which engage cams 21. Impellers 28 are connected to the long arms of bell cranks 22 by means of pivoted links 29 and to the long arms of bell cranks 25 by pivoted links 30. Each impeller rake is provided with a plurality of longitudinal rows of depending tines 31.

The impellers may be of any suitable number, disposed longitudinally of the kettle in parallel relation. They are shown as three in number, and for each impeller there is one cam 20 on shaft 12, one cam 21 on shaft 18 and two bell cranks 22 and 25. It will be seen that simultaneous rotation of shafts 12 and 18 will rock bell cranks 22 and 25 and cause the impeller rakes to partake of a combined up and down and a longitudinal motion.

In order to control this motion of the impeller rakes, I provide eccentrics 32 adjustably mounted on shaft 16 in substantial alignment with cams 20 and 21. Connecting rods 33 pivotally connect each eccentric 32 with one of the links 29.

When the cams 20 and 21 are rotated in the direction of the arrows, the bell cranks 22 and 25 will act through links 29 and 30 to impart an up and down movement to rakes 28. The action of connecting rods 33 operated by eccentrics 32 will restrict the movement of impeller rakes 28 to an elliptical path indicated at 34 in Figure 1. The tines 31 will dip into the liquid in the kettle, moving from right to left in Figure 1 and return above the level of the cooking liquid. At each revolution of the cam shafts the tines will dip into the cooking liquid, engaging and immersing chips floating on the surface of the solution, and advancing said chips longitudinally towards the outlet end of the kettle. The elliptical path indicated at 34 in Figures 1 and 3 has its minor axis disposed in a substantially horizontal plane, that is, in a position parallel to the direction of travel of the chips through the kettle. The purpose of this elliptical path as compared to a circular path is to shorten the period of immersion of the chips, and at the same time decrease the distance the chips are advanced with each revolution of the cam shafts.

An important object of the present invention is to control the shape of the ellipse and the angular relation of the ellipse with a vertical plane passed transversely through the container.

The angular position of the ellipse 34 is controlled by the relative positions of cam 20 and eccentric 32. In Figures 3, 4 and 5 different relative positions of the cam and eccentric are illustrated. For convenience of illustration, the cam 20 is shown in the same position in each view, and the eccentric is shown in varying positions. It is to be understood, however, that in place of moving the eccentric in relation to the cam, the cam may be moved in relation to the eccentric, that is, the cam and eccentric are capable of phase displacement relative to each other.

With the cam in the position indicated, and the eccentric arranged with its throw disposed above the shaft 16 in a vertical plane therewith, the major axis of the ellipse produced by rotation of shafts 12 and 16 will be vertically disposed, as indicated at 34 in Figures 1 and 3. When, however, the throw of the eccentric is moved into a horizontal position to the right of the shaft 16, and the cam is in its indicated position, the major axis of the ellipse will be inclined at an angle of about 60° with the horizontal plane of the longitudinal axis of the container, as indicated in Figure 4. When the throw of eccentric 32 is disposed in a horizontal plane to the left of shaft 18, and with the cam in its indicated position, the impellers will move in an elliptical path having its major axis inclined in the opposite direction at an angle of about 60° to the horizontal plane as indicated in Figure 5. Any angle between that shown in Figures 4 and 5 may be obtained by moving the eccentrics to the desired position. The major axis of the ellipse is thus shiftable through an arc having a chord parallel to the longitudinal axis of the container.

In the position of the cam and eccentric shown in Figure 4, the period of immersion is somewhat shorter than that obtained in Figure 5 while the distance the chips are advanced is greater than in Figure 5. By using inclined tines in Figure 4, the tines will tend to lift and separate the chips on the up-stroke, and turn them over.

Changing the shape of cam 20, as indicated at 20′ in Figure 6, will change the path of the impellers, as indicated at 35 in Figure 6 in which the chips are immersed for a longer period and advanced farther on each stroke of the impeller.

The minor axis of the ellipse 34 may be increased by increasing the size and throw of eccentric 32. It is more convenient, however, to accomplish this result by providing an adjustable connection between connecting rod 33 and link 29, as shown in detail in Figures 7, 8 and 9. The link 29 is provided with a longitudinal slot 36 in which a slide block 37 is adjustably bolted. Connecting rod 33 is pivotally connected to the slide block 37. The minor axis of the ellipse may be increased or decreased by adjusting the position of slide block 37 in slot 36.

The adjustable connection illustrated in Figures 7 to 9 is intended to be used with all forms of the invention illustrated in Figures 1 to 6 and is generally shown in these figures because Figures 3 to 6 are more or less diagrammatic views.

In place of the eccentrics 32, any suitable cam mechanism may be employed. The eccentric 32 is obviously a cam, but the terms "eccentric" and "cam" are used in the specification and claims to distinguish the elements 20 and 32 and not to indicate any difference in their operation as cams.

It will be seen that the present invention provides a simple adjustment for the impeller motion so that the varying factors involved in the variations of the material treated may be easily coped with. Each impeller may be adjusted independently to obtain the desired motion and the desired cooking treatment of the chips.

The cams 20 and 21 and eccentrics 32 are preferably provided with collars 38 removably attached to the shafts, as by set screws, to facilitate their phase adjustment with respect to their operating shafts.

While I have shown and described the preferred embodiment of the invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. In an apparatus of the character described, a container for the reception of a cooking liquid, an impeller therein, a supporting frame arranged in proximity to the container, a cam mechanism supported by the frame, a link connecting the cam mechanism to the impeller and adapted to impart an up and down motion to the impeller, a rotating eccentric carried by the frame, a connecting rod pivotally connecting the link with the eccentric to impart a longitudinal motion to the impeller, means to vary the angular relation between the throw of said eccentric and the throw of the cam mechanism to control the path of the impeller, and means to adjust the point of connection of the connecting rod and the impeller link.

2. In an apparatus of the character described, a container for the reception of a cooking liquid, an impeller in said container above the level of the liquid therein, means to move said impeller in an elliptical path to cause said impeller to dip into the cooking liquid, and means to vary the angular relation between the major axis of the elliptical path and a vertical plane.

3. In an apparatus of the character described, a container for the reception of a cooking liquid, a supporting frame arranged in proximity to the container, an impeller arranged in the container and supported by the frame, means to move said impeller in an elliptical path to cause the impeller to dip into the cooking liquid, and means to vary the angular relation between the major axis of the elliptical path and a vertical plane.

4. In an apparatus of the character described, a container for the reception of a cooking liquid and adapted to have potato chips moved therethrough, an impeller in said container above the level of the liquid therein, said impeller having depending members, means to move said impeller in an elliptical path to cause said depending members to dip into the cooking liquid when traveling in one direction for engaging and advancing the chips and to return at a level above that of the cooking liquid when traveling in the opposite direction, the major axis of the elliptical path being substantially vertically arranged whereby the advancement of the chips during each stroke is determined by the minor axis of the elliptical path, and means to vary the angular relation between the major axis of the elliptical path and a vertical plane passed transversely through the container.

5. In an apparatus of the character described, a container for the reception of a cooking fluid, a supporting frame, an impeller arranged in the container, a cam mechanism supported by the frame, a link connecting the cam mechanism to the impeller and adapted to impart an up and down motion to said impeller, a rotating eccentric carried by the frame, a connecting rod pivotally connecting the link with the eccentric to impart an elliptical motion to the impeller, and means to vary the angular relation between the throw of said eccentric and the throw of the cam mechanism.

6. In an apparatus of the character described, a container for the reception of a cooking liquid, an impeller in said container above the level of the liquid therein, means to move said impeller in an elliptical path to cause said impeller to dip into the cooking liquid, means to vary the minor axis of the elliptical path of the impeller, and means to vary the angular relation of the major axis of the elliptical path of the impeller with respect to a vertical plane.

7. In an apparatus of the character described, a container for the reception of a cooking fluid, a supporting frame arranged in proximity to said container, an impeller arranged in said container and supported by said frame, means to move said impeller in an elliptical path to cause said impeller to dip into the cooking liquid, means to vary the ratio of the minor axis to the major axis of the elliptical path, and means to vary the angular relation of the major axis of the elliptical path of the impeller with respect to a vertical plane.

8. In an apparatus of the character described, a container for the reception of a cooking liquid and adapted to have potato chips moved therethrough, an impeller in said container above the level of the liquid therein, said impeller having depending members, means to move said impeller in an elliptical path to cause said depending members to intermittently dip into the cooking liquid when traveling in one direction, for engaging and advancing the chips and to return at a level above that of the cooking liquid when traveling in the opposite direction, the major axis of the elliptical path of the impeller being substantially vertically arranged whereby the advancement of the chips during each stroke of the impeller is determined by the minor axis of the elliptical path, means to vary the length of the minor axis of the elliptical path, and means to vary the angular relation of the major axis of the elliptical path of the impeller with respect to a vertical plane.

9. In an apparatus of the character described, a container for the reception of a cooking liquid and adapted to have potato chips moved therethrough, an impeller in said container above the level of the liquid therein, said impeller having depending tines inclined in the direction of travel of the chips through the container, and means to move said impeller in an elliptical path to cause said impeller to dip into the cooking liquid, the major axis of the elliptical path being inclined in the direction of inclination of the impeller tines.

10. In an appartus of the character described, a container for the reception of a cooking liquid and adapted to have potato chips moved therethrough, an impeller in said container above the level of the liquid therein, said impeller having depending tines inclined in the direction of travel of the chips through the container, means to move said impeller in an elliptical path to cause said impeller to dip into the cooking liquid, the major axis of the elliptical path being inclined in the direction of inclination of the impeller tines, and means to vary the length of the minor axis of the elliptical path.

11. In an apparatus of the character described, a container for the reception of a cooking liquid and adapted to have potato chips moved therethrough, an impeller in said container above the level of the liquid therein, said impeller having depending tines inclined in the direction of travel of the chips through the container, means to move said impeller in an elliptical path to cause said impeller to dip into the cooking liquid, the major axis of the elliptical path being inclined in the direction of inclination of the impeller tines, and means to vary the angle of inclination of the major axis of the elliptical path relative to a vertical plane passed transversely through the container.

12. In an apparatus of the character described, a container for the reception of a cooking liquid, a supporting frame arranged in proximity to the container, a bell crank lever pivotally mounted on the frame, an impeller arranged in the container, a link pivotally connecting the impeller with one arm of the bell crank lever, a cam mechanism operatively engaging the other arm of the bell crank lever to rock the bell crank lever, a rotating eccentric carried by the frame, a connecting rod pivotally connecting the eccentric with the impeller link, whereby the impeller is caused to move in an elliptical path, and the throw of the eccentric being adjustably variable with respect to the throw of the cam to control the position of the major axis of the elliptical path.

13. In an apparatus of the character described, a container for the reception of a cooking liquid, a supporting frame arranged in proximity to the container, a bell crank lever pivotally mounted on the frame, an impeller arranged in the container, a link pivotally connecting the impeller with one arm of the bell crank lever, a cam mechanism operatively engaging the other arm of the bell crank lever to rock the lever, a rotating eccentric carried by the frame, a connecting rod operatively engaging the eccentric and having an adjustable sliding connection with the impeller link, whereby the impeller is caused to move in an elliptical path, and means to vary the angular relation of the throws of the cam and eccentric to control the angular position of the major axis of the elliptical path with respect to a vertical plane.

14. In an apparatus of the character described, a container for cooking liquid, an impeller for moving food articles longitudinally therethrough, means pivotally suspending said impeller in the container, a cam in operative engagement with a part of said suspension means and rotatable to effect reciprocation thereof in a major axis angled with respect to the longitudinal axis of the container, an eccentric in operative connection with said suspension means and rotatable to effect reciprocation thereof in a minor axis, means for rotating said cam and eccentric in unison whereby said impeller is moved through an ellipse, and said cam and eccentric being adjustable for phase displacement relative to each other to rotate the major axis of the ellipse through an arc whose axis lies in a plane parallel to the longitudinal axis of the container and thus adjustably control the movement of food articles therethrough.

15. The apparatus of claim 14, and means for varying the length of the minor axis of the ellipse.

16. In an apparatus of the character described, a container for cooking liquid, an impeller for moving food articles longitudinally therethrough, means pivotally suspending said impeller in the container, a pair of shafts spaced apart at opposite sides of said suspension means, means for rotating said shafts, impeller moving means on each shaft for compounding movement of the impeller in an ellipse having its major axis angled with respect to the longitudinal axis of the container, and each of said impeller moving means being adjustable on its shaft with respect to the other to vary the angle of the major axis of the ellipse with respect to a plane perpendicular to the longitudinal axis of the container.

17. In an apparatus of the character described, a container for cooking liquid, an impeller therein for moving food articles longitudinally therethrough, means for operating said impeller in an ellipse having one axis disposed in the direction of food travel, and said operating means being adjustable to vary the position of the other axis of the ellipse in an arc whose axis lies in a plane substantially parallel to the longitudinal axis of the container.

JOSEPH D. FERRY.